UNITED STATES PATENT OFFICE.

WILLIAM ROY MOTT, OF LAKEWOOD, OHIO, ASSIGNOR TO NATIONAL CARBON COMPANY, INC., A CORPORATION OF NEW YORK.

ARC-LAMP ELECTRODE.

1,326,605.

Specification of Letters Patent.

Patented Dec. 30, 1919.

No Drawing.    Application filed January 22, 1919. Serial No. 272,739.

*To all whom it may concern:*

Be it known that I, WILLIAM R. MOTT, a citizen of the United States, residing at Lakewood, in the county of Cuyahoga and State of Ohio, have invented a certain new and useful Improvement in Arc-Lamp Electrodes, of which the following is a full, clear, and exact description.

This invention relates to improvements in arc lamp electrodes and more particularly to an improvement in the process of preparing certain flaming materials which are to be incorporated in the electrodes.

One of the most troublesome and deleterious substances which is encountered in the manufacture of electrodes containing flaming materials is water. Almost all of the well known flaming or arc supporting materials are more or less hygroscopic and absorb water during the process of preparation and to a more limited extent even in the finished electrodes. The presence of water either chemically combined or uncombined is disadvantageous for several reasons, particularly because it decreases the candle power, loosens the core and causes cracking during baking or when subsequently used.

Practically all flaming mixes for arc lamp electrodes contain a number of different materials, and the usual method of preparing these consists in fusing them separately to eliminate all of the water united therewith. After fusing, the materials are ground and if not to be used soon, the more hygroscopic materials are kept in a heated drier to prevent water from again combining therewith. In spite of all precautions in factory procedure, some water is absorbed, if not during manufacture, probably during storage prior to use.

Two of the materials which are of great value in cored or flaming carbons are potassium silicate and boric oxid, $B_2O_3$. Under the influence of the heat of the arc these materials wet the carbon and serve to feed the flaming materials more uniformly and serve to quiet the arc. Both of these substances, as is well known, are quite hygroscopic, and previously these, as well as the other flaming materials, were fused separately, ground and treated as previously to eliminate water.

It has now been found that by fusing the potassium silicate and boric oxid together at about red heat, the resulting mass is much less hygroscopic than either of the original materials. For a given period of time a material made in the manner set forth, from one part of potassium silicate and two parts of boric oxid, was found to absorb only about ¼ as much water as the same amount of fused potassium silicate similarly treated, and ½ as much as fused boric oxid. The mix when fused together not only absorbs a smaller amount of water than the separately fused materials, but it absorbs it at a much smaller rate. The proportions of potassium silicate and boric oxid set forth seem to be best, although other proportions such as 1 part of potassium silicate and 4 parts of boric oxid, or equal amounts of each, are considerably less hygroscopic than either of the materials fused separately. The proportion set forth also approximates the proportion which seems to be most satisfactory as far as candle power is concerned, when used in combination with rare-earth fluorids in a cored flame searchlight carbon of high intensity using direct current.

In this combination water is especially undesirable because the rare-earth fluorids react therewith during baking or under the heat of the arc, to produce rare-earth oxids and hydrofluoric acid. The formation of rare-earth oxids decreases candle power and increases the slagging, and hydrofluoric acid, when formed in the arc, produces etching of glass or corrosion of metal parts of the lamp. Boric oxid and potassium silicate are necessary with rare-earth fluorids for reliable operation, but generally the addition of these arc supporters, as well as other flaming materials, lowers the candle power over that of pure rare-earth fluorids, even though water is eliminated. The fused compound, however, appears to actually raise the candle power of high intensity searchlights over pure rare-earth fluorids or rare-earth fluorids with separately fused boric oxid and potassium silicate. The improvement over the latter combination probably is due to the elimination of a reaction which occurs to a certain extent between the boric oxid and rare-earth fluorids, as set forth in the following equation:

$$B_2O_3 + 2ReF_3 = Re_2O_3 + 2BF_3$$

By fusing the boric oxid and potassium silicate together the affinity of the materials for uniting in this manner is substantally decreased and the boric oxid constituent is made less volatile. The fused material is then ground, and it may be stated that, although fused boric oxid is difficult to grind, the fused mass of potassium silicate and boric oxid is readily ground.

In applying the invention to a cored flame searchlight carbon of high intensity, having a core of one-half the diameter of the body of the electrode, the coring material may consist for example of 20 to 80 parts carbon, 65 to 55 parts rare-earth fluorid and 5 to 15 parts of the ground material resulting from fusing together potassium silicate and boric oxid of the 1 to 2 mixture which has been previously referred to. A specific coring material consists of 30 parts carbon, 58 parts rare-earth fluorids and 12 parts of the fused mass set forth.

The fusion probably results in the formation of a compound of the two materials, but on account of the nature of the resultant mass it is difficult to determine to what extent or in what manner the boric oxid and potassium silicate are combined, and applicant does not desire to limit the invention to any particular compound as no compound may be formed.

In the foregoing description specific reference has been made to boric oxid and potassium silicate, because these materials are especially desirable in arc lamp electrodes as previously set forth, and the invention therefore is especially important when utilized in connection with these materials. However, according to another aspect of the invention, a similar process of fusing two hygroscopic salts together to secure a material less hygroscopic than either, is applicable to a number of other combinations. For instance, other alkali silicates, potassium molybdate ($K_2MoO_4$), potassium tungstate ($K_2WO_4$), potassium borate ($K_2B_2O_4$), or other hygroscopic alkali salts of non-volatile acids not inherently bad in an arc, may be substituted for the potassium silicate in the combination. Other non-volatile acid oxids may be substituted for the boric oxid. Of the acid oxids besides boric oxid, phosphoric oxid ($P_2O_5$) is the one most suitable for use in electrodes. If potassium borate is substituted for the potassium silicate, then phosphoric acid will be substituted for the boric oxid.

Having described my invention, what I claim is:

1. The process of preparing a flaming material for arc lamp electrodes, which consists in fusing a hygroscopic alkali salt of a non-volatile oxy-acid with a hygroscopic non-volatile acid oxid to produce a material less hygroscopic than either of the constituents.

2. The process of preparing a flaming material for arc lamp electrodes, which consists in grinding a hygroscopic alkali salt of a non-volatile oxy-acid with a hygroscopic non-volatile acid oxid, fusing a mixture of these materials and grinding the fused mass to produce a material less hygroscopic than either of the constituents.

3. The process of preparing a flaming material for arc lamp electrodes, which consists in fusing a hygroscopic alkali silicate with a hygroscopic non-volatile acid oxid to produce a material less hygroscopic than either of the constituents.

4. The process of preparing a flaming material for arc lamp electrodes which consists in fusing a hygroscopic alkali silicate with boric oxid to produce a material less hygroscopic than the silicate or boric oxid.

5. The process of preparing a flaming material for arc lamp electrodes which consists in fusing a mixture of a hygroscopic alkali silicate with boric oxid and grinding the fused mass to produce a material less hygroscopic than either of the constituents.

6. The process of preparing a flaming material for arc lamp electrodes, which consists in fusing potassium silicate with boric oxid to produce a material less hygroscopic than the potassium silicate and boric oxid.

7. The process of preparing a flaming material for arc lamp electrodes which consists in fusing a mixture of potassium silicate and boric oxid and grinding the fused mass to produce a material less hygroscopic than the potassium silicate or boric oxid, and mixing the ground material with the other flaming materials.

8. The process of preparing a flaming material for arc lamp electrodes, which consists in fusing one part of potassium silicate with two parts of boric oxid to produce a material less hygroscopic than either of the constituents.

9. An arc lamp electrode containing a fused mixture of potassium silicate and boric oxid.

10. An arc lamp electrode containing a combination of potassium silicate and boric oxid in a form less hygroscopic than either of the materials alone.

11. An arc lamp electrode containing a non-hygroscopic combination of potassium silicate and boric oxid.

12. An arc lamp electrode containing a non-hygroscopic combination comprising one part of potassium silicate and two parts of boric oxid.

13. An arc lamp electrode having a carbon shell and a core containing a non-hygroscopic combination comprising one part of potassium silicate and two parts of boric oxid.

14. An arc lamp electrode containing rare-earth fluorids mixed with potassium silicate and boric oxid fused together.

15. A coring material for an arc lamp electrode containing 65 to 55 parts rare-earth fluorids, and 5 to 15 parts of a fused mixture of potassium silicate and boric oxid.

16. A coring material for an arc lamp electrode containing carbon and a flaming material consisting of 58 parts rare-earth fluorids and 12 parts of a fused mixture of potassium silicate and boric oxid.

In testimony whereof, I hereunto affix my signature.

WILLIAM ROY MOTT.